United States Patent [19]

Yanagi et al.

[11] Patent Number: 5,349,820
[45] Date of Patent: Sep. 27, 1994

[54] INLET UNION FOR MASTER CYLINDER

[75] Inventors: Kunio Yanagi; Syusaku Chiba, both of Saitama, Japan

[73] Assignee: Jidosha Kiki Co., Ltd., Tokyo, Japan

[21] Appl. No.: 12,129

[22] Filed: Feb. 1, 1993

[30] Foreign Application Priority Data

| Feb. 18, 1992 | [JP] | Japan | 4-016198[U] |
| Mar. 30, 1992 | [JP] | Japan | 4-026418[U] |
| Aug. 21, 1992 | [JP] | Japan | 4-058790[U] |

[51] Int. Cl.$^5$ ............................................ B60T 11/20
[52] U.S. Cl. ........................................ 60/562; 60/585; 60/592
[58] Field of Search ............... 60/547.1, 562, 580, 60/581, 583, 585, 588, 589, 592

[56] References Cited

U.S. PATENT DOCUMENTS

| 4,807,438 | 2/1989 | Tsubouchi et al. | 60/585 |
| 4,858,437 | 8/1989 | Ochiai | 60/562 |
| 4,934,144 | 6/1990 | Larin | 60/585 |
| 5,161,375 | 11/1992 | Crumb et al. | 60/589 X |
| 5,161,376 | 10/1992 | Hartmann | 60/589 X |

FOREIGN PATENT DOCUMENTS

| 0160607 | 9/1983 | Japan | 60/562 |
| 0188743 | 11/1983 | Japan | 60/562 |
| 63-50207 | 12/1988 | Japan | |
| 3-52270 | 5/1991 | Japan | |
| 3-76760 | 7/1991 | Japan | |

Primary Examiner—Edward K. Look
Assistant Examiner—Hoang Nguyen
Attorney, Agent, or Firm—Nixon & Vanderhye

[57] ABSTRACT

An inlet union for master cylinder of the present invention is so constructed that a flange portion is disposed at the periphery of a duct member, a circular raised portion whose outside diameter is smaller than that of the flange portion is integrally formed, at least one convex portion protruding radially is disposed at the outer periphery of the circular raised portion, attaching holes for the duct members are disposed in the top plate of an attaching cover, a plurality of concave portions corresponding to the convex portion of circular raised portion of the flange portion are disposed at the inner periphery of the attaching hole so that the convex portion of the duct member selectively engages with the concave portion of the attaching cover, and a mounting portion is formed at the inner periphery of the attaching cover to mount the outer periphery of the flange portion.

5 Claims, 7 Drawing Sheets

FIG.1
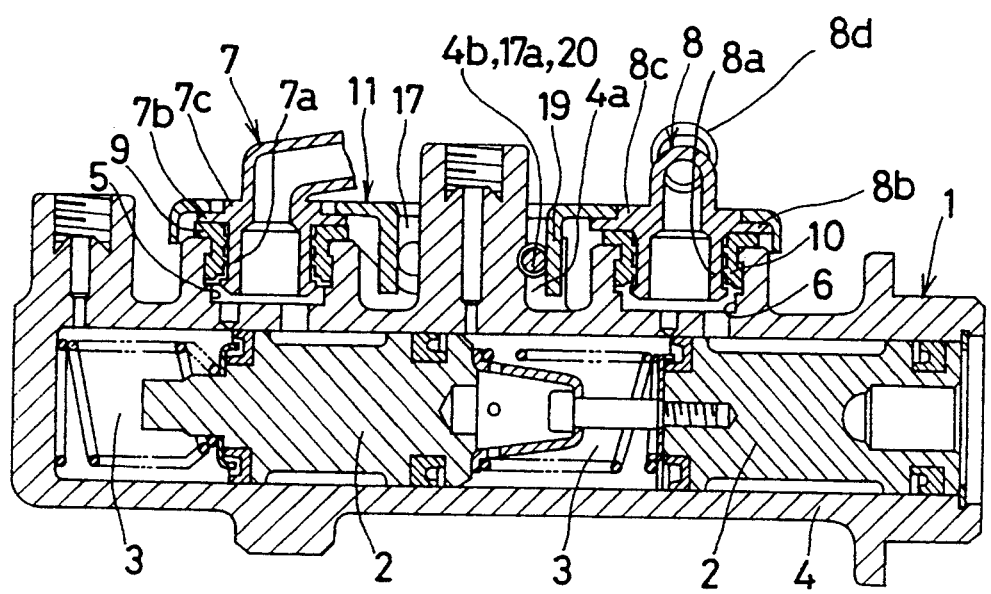
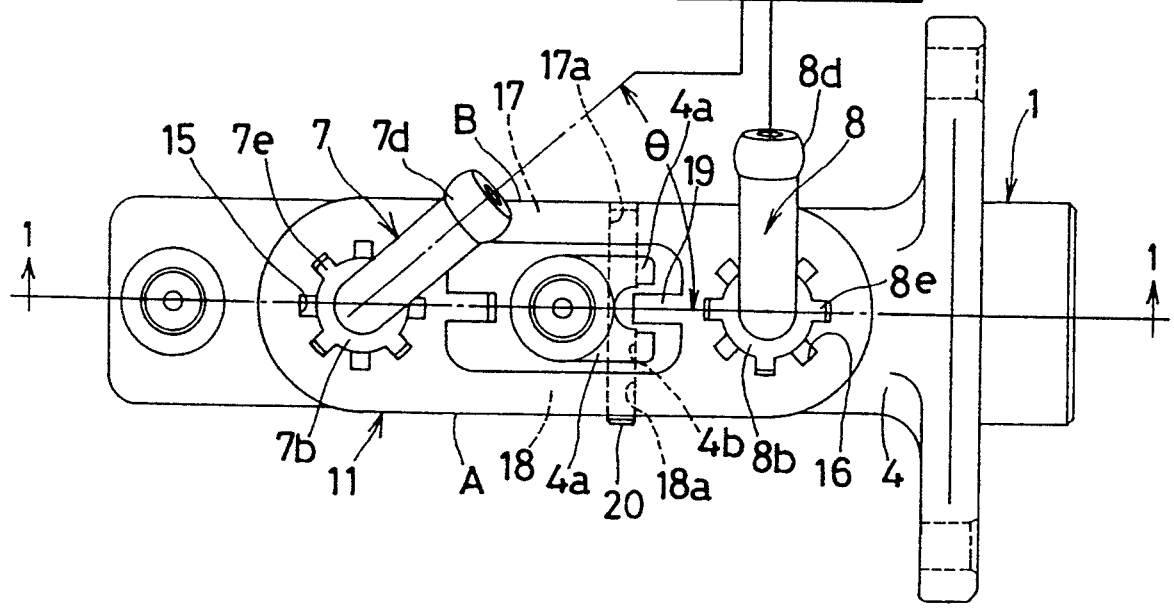
FIG.2

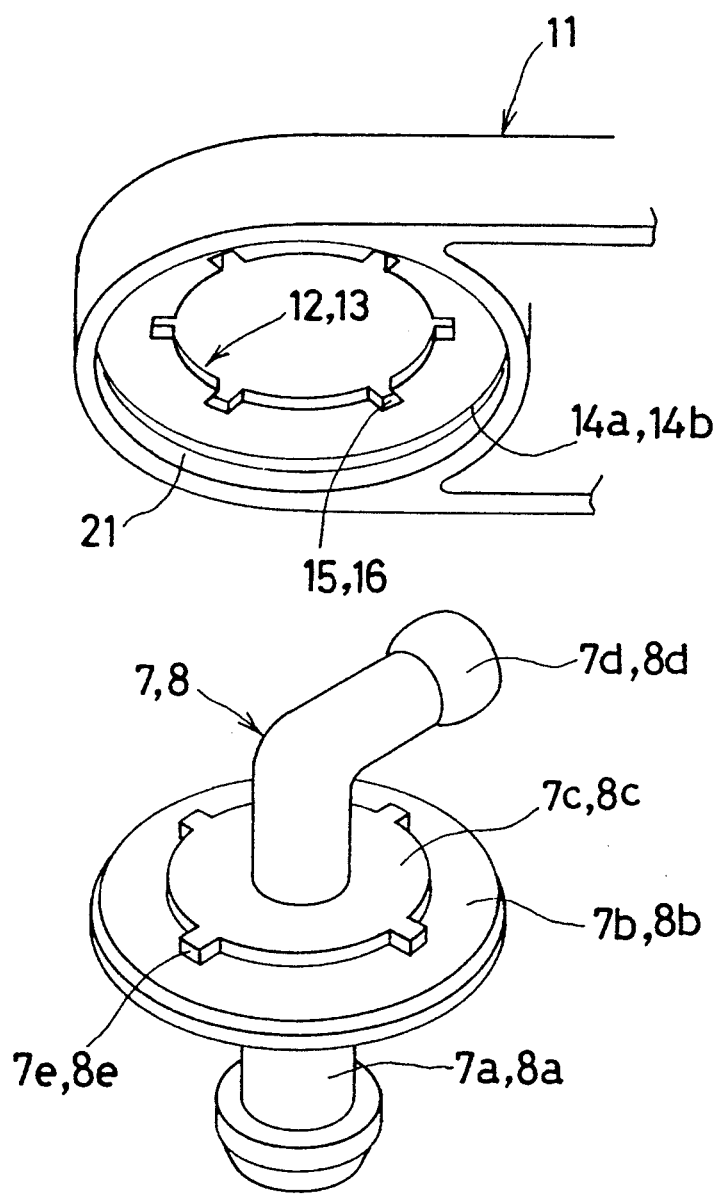

INLET UNION FOR MASTER CYLINDER

FIELD OF THE INVENTION AND RELATED ART STATEMENT

The present invention relates to an inlet union for a master cylinder, for example a tandem master cylinder, used for a vehicle's brake system.

Some conventional tandem master cylinders have a reservoir which is installed directly thereto and stores working fluid and supplies it from the reservoir to a pressure chamber Other conventional tandem master cylinders supplies working fluid from a reservoir installed on the vehicle body to a pressure chamber via a hose. In the latter master cylinders, an inlet union is installed to supply working fluid from the reservoir to each pressure chamber via a hose, and the inlet union has two independent duct members.

The inlet union comprises two independent duct members having an insert portion and a flange portion and an attaching cover (or a fixing member). The insert portion of each duct member is inserted in a working fluid supply port of master cylinder via an annular seal member, and the flange portion thereof is attached to the master cylinder in such a manner that it is pressed against the master cylinder side (for example, Japanese Utility Model Provisional Publication No. 39351/1981 or Japanese Utility Model Provisional Publication No. 63161/1983). The working fluid supply port communicates with the pressure chamber of master cylinder.

The conventional inlet union described above is constructed so as to be installed together with the attaching cover after the insert portion of duct member has been inserted in the working fluid supply port corresponding to each insert portion. When the hose connecting direction for each duct member differs, it is difficult for the hose connecting portion to be inserted in a hole made in the top plate of attaching cover, thereby the assembly work being troublesome.

In particular, it is not easy to prepare a subassembly of a duct member whose hose connecting direction is predetermined and an attaching cover for each type of vehicle. In addition, it is impossible to assemble an inlet union while freely changing the hose connecting direction in accordance with the vehicle type. Thus, the conventional inlet union has a disadvantage of less flexibility and poor assembling efficiency. The inlet union and the attaching cover may be molded into one piece by using a resin material. However, they sometimes cannot be molded because the orientation of inlet union differs with the vehicle type.

OBJECT AND SUMMARY OF THE INVENTION

Accordingly, an object of the present invention is to provide an inlet union for master cylinder which can be assembled to the master cylinder easily and reliably, has an improved assembling efficiency, and freely selects the hose connecting direction.

In view of the above-described problems of the known art, the present invention is aimed at providing an inlet union for master cylinder which comprises a plurality of independent duct members for supplying working fluid from a reservoir to pressure chambers in a master cylinder in which a plurality of sets of piston and pressure chamber are arranged in series in the axial direction and a con, non attaching cover for attaching the duct members, in which a flange portion is disposed at the periphery of the duct member, a circular raised portion whose outside diameter is smaller than that of the flange portion is integrally formed, at least one convex portion protruding radially is disposed at the outer periphery of the circular raised portion, attaching holes for the duct members are disposed in the top plate of the attaching cover, a plurality of concave portions corresponding to the convex portion of circular raised portion of the flange portion are disposed at the inner periphery of the attaching hole so that the convex portion of the duct member selectively engages with the concave portion of the attaching cover, and a mounting portion is formed at the inner periphery of the attaching cover to mount the outer periphery of the flange portion.

In the inlet union for master cylinder in accordance with the present invention, a flange portion is disposed at the periphery of each of a plurality of independent duct members, a circular raised portion whose outside diameter is smaller than that of the flange portion is integrally formed, at least one convex portion protruding radially is disposed at the outer periphery of the circular raised portion, attaching holes for the duct members are disposed in the top plate of the attaching cover, a plurality of concave portions corresponding to the convex portion of circular raised portion of the flange portion are disposed at the inner periphery of the attaching hole so that the convex portion of the duct member selectively engages with the concave portion of the attaching cover, and a mounting portion is formed at the inner periphery of the attaching cover to mount the outer periphery of the flange portion. Therefore, the convex portions of the circular raised portion can be engaged with the concave portions of the attaching hole, and the duct member and the attaching cover can be assembled in advance as a subassembly. The attachment/detachment of the duct member and attaching cover and the engagement/disengagement of the concave and convex portions of these elements can be performed easily. Since the convex portions of the duct member is selectively engaged with the concave portions of the attaching cover, the hose connecting direction of the duct member can be freely changed at the stage of subassembly to respond to the sudden change of vehicle type.

As described above, the inlet union for master cylinder in accordance with the present invention comprises a plurality of independent duct members for supplying working fluid from a reservoir to pressure chambers in a master cylinder in which a plurality of sets of piston and pressure chamber are arranged in series in the axial direction and a common attaching cover for attaching the duct members, in which a flange portion is disposed at the periphery of the duct member, a circular raised portion whose outside diameter is smaller than that of the flange portion is integrally formed, at least one convex portion protruding radially is disposed at the outer periphery of the circular raised portion, attaching holes for the duct members are disposed in the top plate of the attaching cover, a plurality of concave portions corresponding to the convex portion of circular raised portion of the flange portion are disposed at the inner periphery of the attaching hole so that the convex portion of the duct member selectively engages with the concave portion of the attaching cover, and a mounting portion is formed at the inner periphery of the attaching cover to mount the outer periphery of the flange portion. Therefore, the duct men, bet whose hose connecting direction has been set in advance for the vehicle type and the attaching cover can be prepared easily as a subassembly, by which the assembling work to the master cylinder can be done rapidly and reliably even by an unskilled worker, so that the ease of assembly can be increased.

Also, in the inlet union of the present invention, the duct member and the attaching cover are not separated in handling and assembling, and the attachment/detachment of the duct member and attaching cover and the engagement/disengagement of the concave and convex portions of these elements can be performed easily in accordance with the vehicle type; therefore, the handling work is easy. Even if a sudden change of vehicle type is made, the hose connecting direction of the duct member can be freely changed at the stage of subassembly, so that the smooth assembling to the master cylinder can be ensured and the work efficiency in the assembly process can be improved.

BRIEF DESCRIPTION OF THE DRAWINGS

In the drawings,

FIG. 1 is a sectional view of an inlet union for master cylinder in accordance with one embodiment of the present invention, FIG. 2 is a plan view of the inlet union shown in FIG. 1, FIG. 3 is a perspective view of a duct member and an attaching cover which compose the inlet union shown in FIG. 1, FIG. 4 is a view showing the attaching cover shown in FIG. 3, in which

DETAILED DESCRIPTION OF PREFERRED EMBODIMENTS

Figure 4A:
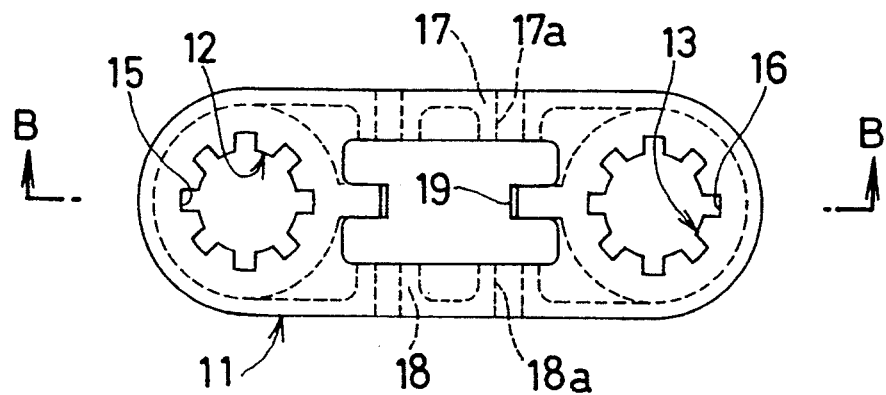
FIG. 4(A) is the top plan view.

The present invention will be described in detail with reference to the embodiments shown in the drawings.

Figure 4B:
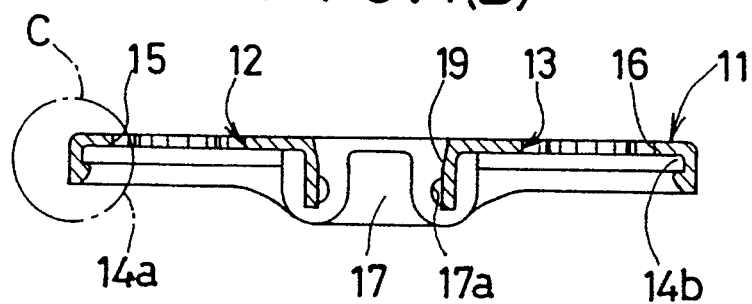
FIG. 4(B) is a sectional view taken along the line B—B of FIG. 4(A)
Figure 4C:
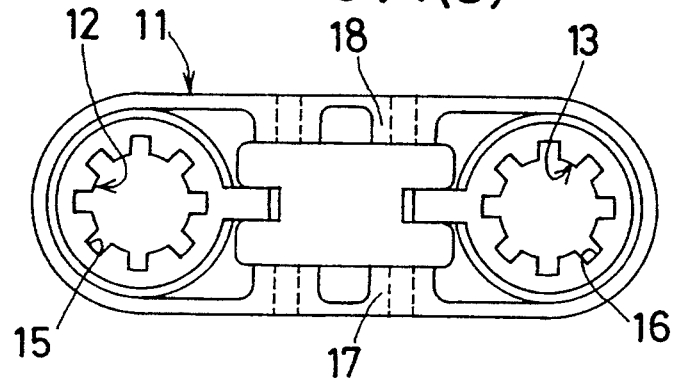
FIG. 4(C) is the bottom plan view.
Figure 5:
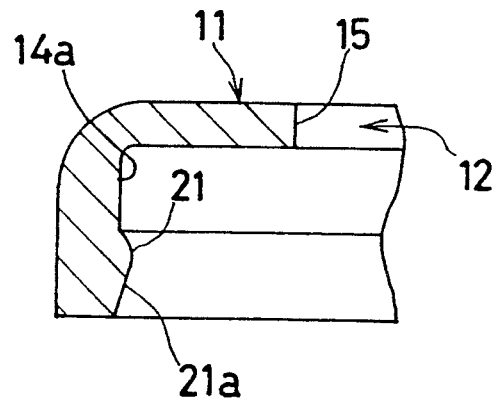
FIG. 5 is a partially expanded view of portion C in FIG. 4(B)
Figure 6:
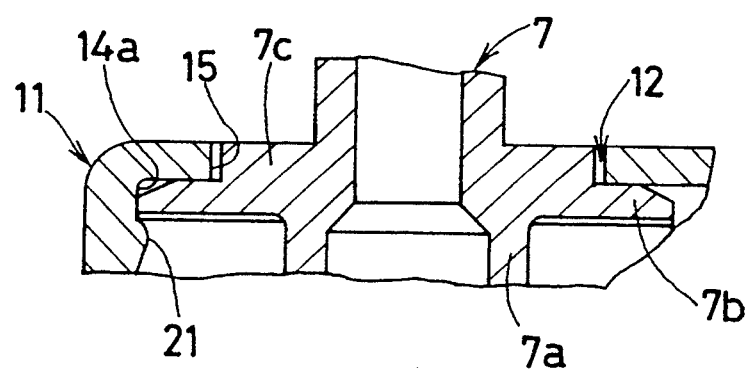
FIG. 6 is a partially sectional view showing the engaging condition of the duct member and the attaching cover.
Figure 7:
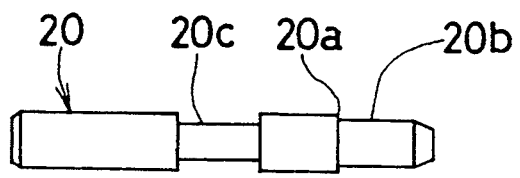
FIG. 7 is a front view of a coupling pin which installs the attaching cover to a master cylinder.

FIGS. 1 through 7 show one embodiment of an inlet union for master cylinder in accordance with the present invention. FIG. 1 is a sectional view thereof, FIG. 2 is a plan view of FIG. 1, and FIG. 3 is a perspective view of a duct member and an attaching cover. FIG. 4 shows an attaching cover; FIG. 4(A) is the top plan view, FIG. 4(B) is a sectional view taken along the line B—B of FIG. 4(A), and FIG. 4(C) is the bottom plan view. FIG. 5 is a partially expanded view of portion C in FIG. 4(B), FIG. 6 is a partially sectional view showing the engaging condition of the duct member and the attaching cover, and FIG. 7 is a front view of a coupling pin.

Referring to FIGS. 1 and 2, reference numeral 1 denotes a tandem master cylinder in which a plurality of pistons 2, 2 and pressure chambers 3, 3 are disposed in series in the axial direction of cylinder. The master cylinder 1 of this type has a plurality of sets of piston 2 and pressure chamber 3 disposed alternately. (one piston 2 and one pressure chamber 3 forms one set. This embodiment has two sets.) The tandem master cylinder 1 has a substantially cylindrical cylinder body 4. At the upper part of the cylinder body 4, working fluid supply ports 5, 6 are arranged at intervals in the axial direction of cylinder to supply working fluid from a reservoir 1a to the pressure chambers 3, 3. To the working fluid supply ports 5, 6, independent duct members 7, 8 are installed by means of a later-described, common attaching cover 11. The duct member 7, 8 is molded into one piece by using synthetic resin (for example, nylon) or other materials in such a manner that its inside passes through. The duct member 7, 8 comprises an insert portion 7a, 8a disposed on one side, a flange portion 7b, 8b which is disposed at the periphery at the intermediate position and used for attachment, a circular raised portion 7c, 8c which is formed integrally with the upper surface of the flange portion 7b, 8b on the reservoir side, and a substantially L-shaped hose connecting portion 7d, 8d disposed on the other side.

The insert portions 7a, 8a are connected to the master cylinder 1 by being inserted in the working fluid supply ports 5, 6 in the cylinder body 4, respectively, via an annular seal member 9, 10. The hose connecting portions 7d, 8d are connected to a not illustrated reservoir installed on the vehicle body through a connecting hose (not shown).

The flange portion 7b, 8b for attachment has an outside diameter corresponding to the diameter of inner periphery of later-described attaching cover, and the circular raised portion 7c, 8c has an outside diameter smaller than that of the flange portion 7b, 8b. At the periphery of the circular raised portion 7c, 8c, a plurality of convex portions 7e, 8e (at least one, though four convex portions are disposed in this embodiment), which protrude radially, are disposed at certain intervals circumferentially. The convex portions 7e, 8e are arranged at positions opposite to each other. These portions 7e, 8e are disposed to determine the rotational positions of the duct members 7, 8, and formed into a tooth shape of spur gear.

The attaching cover 11 installs and connects the duct members 7, 8, which are inserted in the working fluid supply ports 5, 6 of the cylinder body 4, to the tandem master cylinder 1 at the same time. It is molded into one piece by using synthetic resin (for example, polypropylene) or other materials. The attaching cover 11 is formed into flat, substantially elliptical shape extending in the axial direction of cylinder, by which it is positioned in the area including the working fluid supply ports 5, 6 in the cylinder body 4.

On both sides of the top plate of attaching cover 11 (right and left sides in FIGS. 4 through 6), attaching holes 12, 13 are made through which the hose connecting portions 7d, 8d of duct members 7, 8 are passed, respectively. At the inner periphery of the attaching hole 12, 13, a plurality of concave portions 15, 16 (eight concave portions in this embodiment) are disposed to correspond to the convex portions 7e, 8e disposed at the circular raised portion of the flange portion 7b, 8b. The concave portions 15, 16 are arranged at certain intervals circumferentially, and formed into a tooth shape of spur gear corresponding to the convex portion 7e, 8e. The number of concave portions 15, 16 is always larger than that of convex portions 7e, 8e of the circular raised portion 7c, 8c.

The orientation θ of the hose connecting portion 7d or 8d of the duct member 7, 8 can be changed appropriately in accordance with the vehicle type by selecting the position of convex portions 7e, 8e of duct member engaging with the concave portions 15, 16 of the attaching cover 11. The orientation θ of the hose connecting portion 7d shown in FIG. 2 is a horizontal angle formed between the centerline of the hose connecting portion 7d and the axis of the cylinder.

The attaching cover 11 has depressed portions 14a, 14b formed corresponding to the positions of attaching holes 12, 13. At the inner periphery of the depressed portion 14a, 14b, a protrusion 21 is formed which protrudes in the direction in which its portions face onto each other, as shown in FIG. 5. Between the protrusion 21 and the top plate of attaching cover 11, a flange portion 7b, 8b of the duct member 7, 8 is mounted. For this reason, the protrusion 21 is located at the position corresponding to the thickness of the flange portion 7b, 8b to prevent the flange portion 7b, 8b from coming off after the flange portion 7b, 8b is pressed in and mounted. The protrusion 21 has a tapered surface 21a such that the diameter increases gradually toward the inlet of attaching cover 11. This tapered surface 21a enables the outside diameter of the flange portion 7b, 8b to be pressed in and mounted against the elastic force of the protrusion 21.

Thus, the duct member 7, 8 can be assembled to the attaching cover 11 in advance as a subassembly. The assembled condition is shown in the partially sectional view of FIG. 6.

At the center portion of the attaching cover 11, coupling portions 17, 18 are formed to fix the attaching cover 11 to the tandem master cylinder 1 as shown in FIG. 4. On each end of the coupling portion 17, 18, bores 17a, 18a are made so that a coupling pin 20 is inserted. An engaging tongue 19 protrudes downward from the top plate as shown in FIG. 4 at the intermediate position of the bore 17a, 18a over the passage for the coupling pin 20 to be inserted into the bore 17a, 18a. Of the two bores 17a, 18a, one bore 17a has a smaller inside diameter than the other bore 18a, so that the periphery of the bore 17a engages with the step portion 20a of the coupling pin 20 when the coupling pin 20 is inserted, serving as a stopper.

The coupling pin 20, as shown in FIG. 7, has a tip portion 20b which has an outside diameter smaller than the outside diameter of pin to be inserted into the bore 17a in order to install a step portion 20a near the tip. It also has a groove portion 20c at the position corresponding to the engaging tongue 19 of the attaching cover so as to engage with the tip of the engaging tongue 19.

The cylinder body 4 of tandem master cylinder has an attaching portion 4a for fixing the attaching cover 11 as shown in FIGS. 1 and 2. The attaching portion 4a is disposed between the coupling portions 17, 18 of the attaching cover 11. The attaching portion 4a has through holes 4b disposed so as to align with the bores 17a, 18a of the coupling portions 17, 18 when the attaching cover 11 is fixed to the cylinder body 4.

To assemble the inlet union thus constructed, the hose connecting portions 7d, 8d of the duct members 7, 8, which are in the condition shown in FIG. 3, are passed through the attaching holes 12, 13, respectively. Then, the convex portions 7e, 8e of the circular raised portions 7c, 8c are engaged with the concave portions 15, 16 of the attaching holes 12, 13 selected appropriately, and the flange portions 7b, 8b are pushed into the depressed portions 14a, 14b of the attaching cover. The flange portions 7b, 8b, getting over the protrusion 21, are mounted between the top plate of attaching cover 11 and the protrusion 21. Thus, a subassembly with the hose connecting portions 7d, 8d having an appropriate orientation θ is fabricated.

Next, the insert portions 7a, 8a are inserted in the working fluid supply portions 5, 6 of the cylinder body 4 while pressing the flange portions 7b, 8b of the duct members 7, 8 by the peripheries of the attaching holes 12, 13 of the attaching cover 11. Then, the bores 17a, 18a of the coupling portions 17, 18 of the attaching cover 11 are aligned with the through holes 4b of the attaching portion 4a of the cylinder body 4, and the coupling pins 20 are inserted in these bores to fix the attaching cover to the cylinder body 4. Thus, the duct members 7, 8 are mounted to the tandem master cylinder 1 via the attaching cover 11 (refer to FIGS. 1 and 2).

When the coupling pin 20 is inserted, the tip portion 20b is inserted from the bore 18a on side A of the attaching cover 11 shown in FIG. 2 until the step portion 20a abuts against the peripheral stopper of bore 17a of the coupling portion 17. At the same time, the tip of the engaging tongue 19 of the attaching cover 11 is engaged with the groove portion 20c of the coupling pin 20 by its elastic force. As a result, the engagement of the engaging tongue 19 with the groove 20c prevents the coupling pin from coming off.

To remove the attaching cover 11 from the tandem master cylinder 1, the coupling pin 20 is pressed by putting a not illustrated thin rod at the tip face of the connecting pin 20 from side B of the attaching cover 11 shown in FIG. 2. As a result, the tip of the engaging tongue 19 is elastically deformed, so that the engaging tongue 19 is released from the groove portion 20c of the coupling pin 20, by which the coupling pin 20 can be removed, thereby the attaching cover 11 being removed from the tandem master cylinder 1.

In this embodiment of inlet union, the duct member 7, 8 and the attaching cover can be reliably assembled in advance as a subassembly and the assembly work can be done by single operation because the convex portions 7e, 8e of the circular raised portion 7c, 8c disposed on the flange portion 7b, 8b of the duct member 7, 8 are engaged with the concave portions 15, 16 of the attaching hole 12, 13 of the attaching cover 11, and the outer peripheral portion of the flange portion 7b, 8b is mounted to the depressed portion 14a, 14b of the attaching cover 11 by means of the protrusions 21. The hose connecting direction can be freely changed at the stage of subassembly by selectively engaging the convex portions 7e, 8e of the duct member 7, 8 with the concave portions of the attaching cover 11. Therefore, the use of inlet union of this embodiment can rapidly and easily respond to sudden change of vehicle type.

Figure 8:
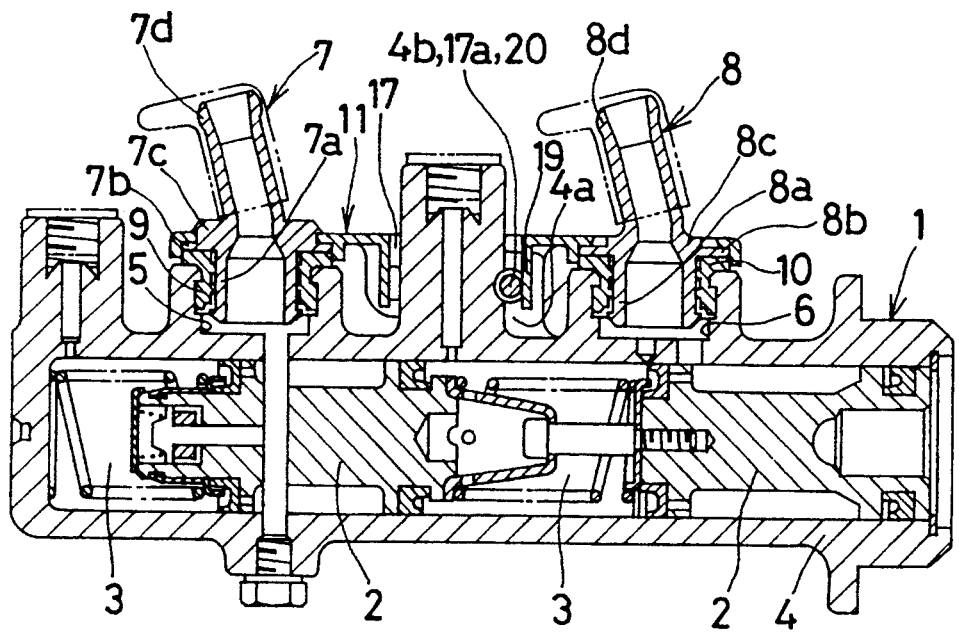
FIG. 8 is a sectional view of an inlet union for master cylinder in accordance with another embodiment of the present invention.
Figure 9:
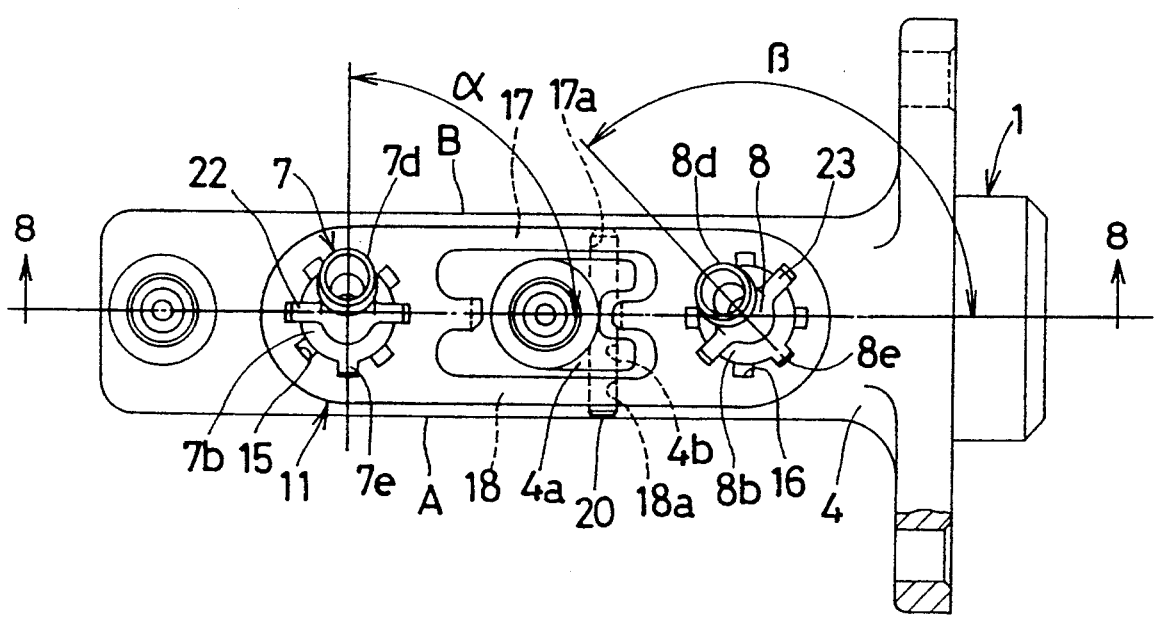
FIG. 9 is a plan view of the inlet union shown in FIG. 8.
Figure 10:
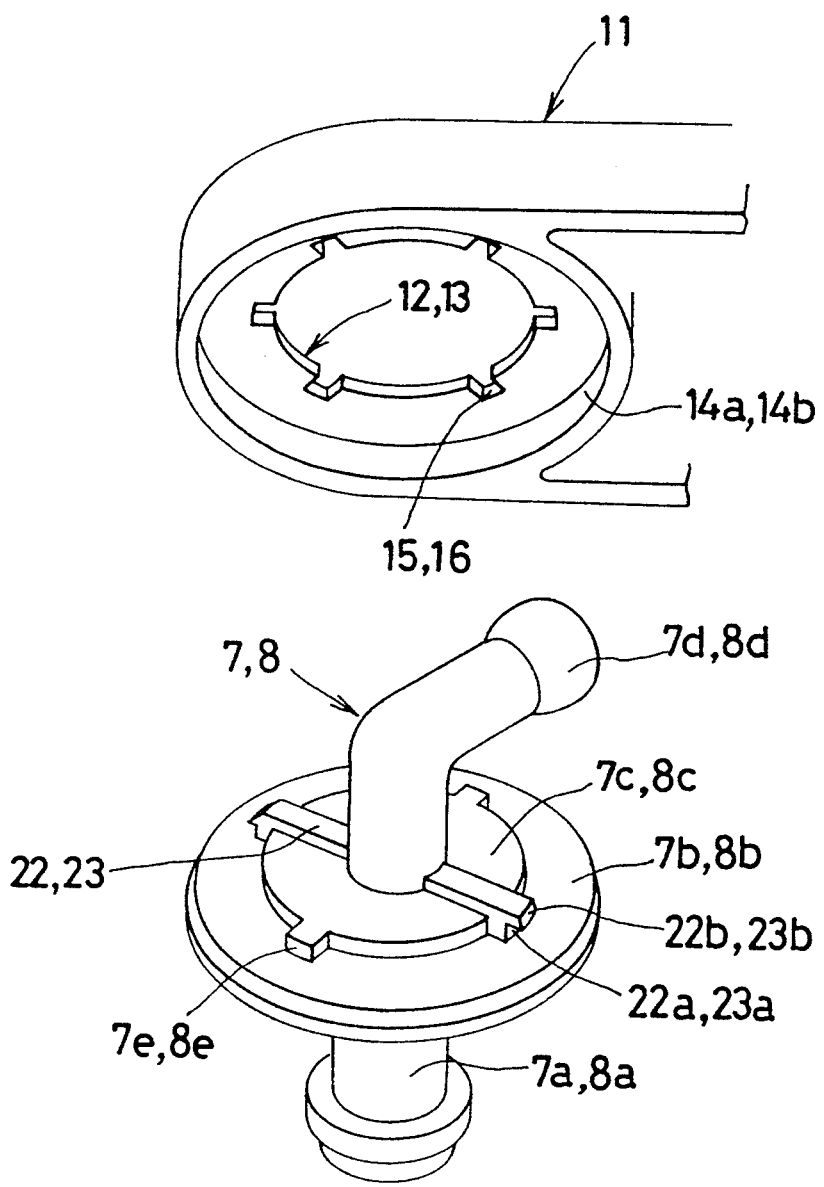
FIG. 10 is a perspective view of a duct member and an attaching cover which compose the inlet union shown in FIG. 8.
Figure 11:
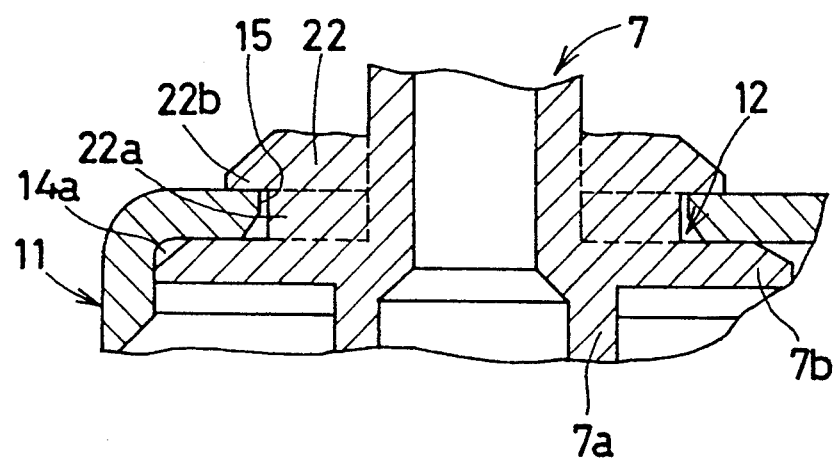
FIG. 11 is a partially sectional view showing the engaging condition of the duct member and the attaching cover.
Figure 12:
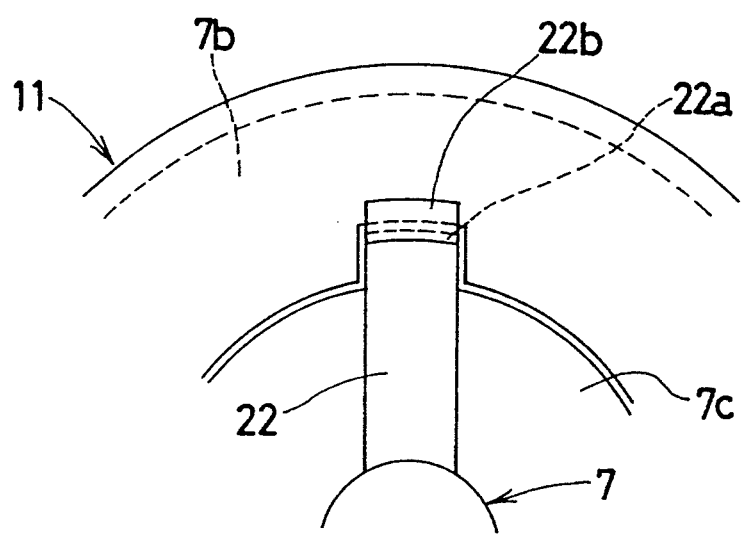
FIG. 12 is a partial plan view showing the engaging condition of the duct member and the attaching cover.

FIGS. 8 through 12 show another embodiment of an inlet union for master cylinder in accordance with the present invention. FIG. 8 is a sectional view thereof, FIG. 9 is a plan view of FIG. 8, FIG. 10 is a perspective view of a duct member and an attaching cover, FIG. 11 is a partially sectional view showing the engaging condition of the duct member and the attaching cover, and FIG. 12 is a plan view of FIG. 11.

On the top of the flange portion 7b, 8b of the duct member 7, 8, a circular raised portion 7c, 8c is integrally formed as with the above embodiment. A plurality of convex portions 7e, 8e (two convex portions in this embodiment), which protrude radially, are disposed at certain intervals circumferentially. The convex portions 7e, 8e are arranged at positions opposite to each other. On the circular raised portion 7c, 8c, engaging members 22, 23, which extend radially by interposing the hose connecting portion 7d, 8d. The engaging members 22, 23 are arranged at the intermediate position between two convex portions 7e, 8e corresponding to these engaging members 22, 23.

At the tip lower part of the engaging member 22, 23, a tooth portion 22a, 23a is disposed which is formed into the same shape as that of the convex portion 7e, 8e. The tooth portion 22a, 23a protrudes from the periphery of the circular raised portion 7c, 8c by the same length as that of the convex portion 7e, 8e to determine the rotational position of the duct member 7, 8, like the convex portion 7e, 8e. On the top of the tooth portion 22a, 23a, a protruding portion 22b, 23b is formed which extends radially beyond the tooth portion 22a, 23a and the convex portion 7e, 8e.

The protruding portion 22b, 23b is disposed to prevent the duct member 7, 8 from coming off from the attaching cover 11. Therefore, the protruding portion 22b, 23b is so constructed as to be placed on the top side of the attaching cover and its lower surface engages with the top surface of the attaching cover 11 when the duct member 7, 8 is mounted to the attaching cover 11 as shown in FIGS. 11 and 12. At the inner periphery of the attaching hole 12, 13 of the attaching cover 11, a plurality of concave portions 15, 16 (six concave portions in this embodiment) are disposed to correspond to the convex portions 7e, 8e disposed at the circular raised portion of flange portion 7b, 8b. In FIG. 9, α and β represent the orientation of the hose connecting portion 7d, 8d, respectively, which are a horizontal angle formed between the centerline of the hose connecting portion 7d, 8d and the axis of the cylinder. Other constructions and assembling method are the same as those of the above-described embodiment.

In this embodiment of inlet union, nearly the same effects can be obtained, and the duct member 7, 8 can be prevented from coming off from the attaching cover 11 because the convex portions 7e, 8e of the circular raised portion 7c, 8c disposed on the flange portion 7b, 8b of the duct member 7, 8 and the tooth portions 22a, 23a of the engaging members 22, 23 are engaged with the concave portions 15, 16 of the attaching hole 12, 13 of the attaching cover 11, and the lower surfaces of protruding portions 22b, 23b of the engaging members 22, 23 engage with the top surface of the attaching cover 11. Also, because the engaging members 22, 23 are disposed on the circular raised portion 7c, 8c, the strength of the duct member 7, 8 in the rotating direction can be increased, and a grommet can be prevented from entering between the attaching cover 11 and the cylinder body 4.

Although the invention has been described in its preferred form with a certain particularity, it is to be understood that the invention is not limited to the above-described embodiments but various changes and modifications may be made within the true spirit and scope of the invention.

For example, the number of the convex portions 7e, 8e and the engaging portions 22, 23 of the duct member and the number of the concave portions of the attaching cover 11 are not limited to those of the above-described embodiments, but can be selected appropriately in accordance with the vehicle type.

We claim:

1. An inlet union for a master cylinder, said inlet union comprising:
a plurality of independent duct members for supplying working fluid from a reservoir to pressure chambers in said master cylinder, said master cylinder having a plurality of sets of piston and pressure chambers arranged in series in an axial direction and a common attaching cover for attaching said duct members, wherein a flange portion is disposed at a periphery of said duct member, a circular raised portion whose outside diameter is smaller than that of said flange portion is integrally formed, at least one convex portion protruding radially disposed at the outer periphery of said circular raised portion, attaching holes for said duct members are disposed in the top plate of said attaching cover, a plurality of concave portions corresponding to the convex portion of circular raised portion of said flange portion are disposed at the inner periphery of said attaching hole so that said convex portion of said duct member selectively engages with said concave portion of said attaching cover, and a depression is formed at the inner periphery of said attaching cover to mount the outer periphery of said flange portion wherein said protruding portions, which protrude radially beyond said convex portion, are disposed on the circular raised portion of said duct member, so that the lower surface of each said protruding portion engages with the top surface of said attaching cover by disposing said protruding portion on the top surface side of said attaching cover when said duct member is mounted to said attaching cover.

2. An inlet union for a master cylinder, said inlet union comprising:
a plurality of independent duct members for supplying working fluid from a reservoir to pressure chambers in said master cylinder, said master cylinder having a plurality of sets of piston and pressure chambers arranged in series in an axial direction and a common attaching cover for attaching said duct members, wherein a flange portion is disposed at a periphery of said duct member, a circular raised portion whose outside diameter is smaller than that of said flange portion is integrally formed, at least one convex portion protruding radially is disposed at the outer periphery of said circular raised portion, attaching holes for said duct members are disposed in the top plate of said attaching cover, a plurality of concave portions corresponding to the convex portion of circular raised portion of said flange portion are disposed at the inner periphery of said attaching hole so that said convex portion of said duct member selectively engages with said concave portion of said attaching cover, and a depression is formed at the inner periphery of said attaching cover to mount the outer periphery of said flange portion, wherein said cover is attached to said master cylinder by coupling pins, bores for said coupling pins are formed at both sides of a coupling portion of said attaching cover for fixing said cover to said master cylinder, said cover further including an engaging tongue disposed at an intermediate position of each of said bores in such a manner as to protrude downward, a groove portion corresponding to said engaging tongue is disposed on each of said coupling pins, through holes are formed in an attaching portion of said master cylinder so that said through hole aligns substantially with the bores of said coupling portion when said attaching cover is fixed, said coupling pin is inserted in said bores of coupling portion of said attaching cover and said through hole of attaching portion of said master cylinder, and said engaging tongue is engaged with the groove portion of said coupling pin to maintain said coupling pin in position and couple said attaching cover to said master cylinder.

3. An inlet union for a master cylinder, said inlet union comprising:

a master cylinder having a body with a plurality of sets of piston and pressure chambers arranged in series in an axial direction in said body;

a plurality of independent duct members for supplying working fluid from a reservoir to said pressure chambers in said master cylinder body; and a common attaching cover, having a top plate, for attaching said duct members to said master cylinder body, wherein each duct member includes a flange portion having a flange diameter and disposed at a periphery of the duct member, said flange portion includes a circular raised portion whose outside diameter is smaller than that of said flange portion and is integrally formed with said flange portion, said circular raised portion includes at least one convex portion protruding radially at an outer periphery of said circular raised portion, said attaching cover including attaching holes for said duct members disposed in the top plate of said attaching cover, said attaching holes including a plurality of concave portions corresponding to the convex portion of circular raised portion of said flange portion disposed at an inner periphery of said attaching hole, wherein said convex portion of said duct member selectively engages with said concave portion of said attaching cover; and a depression is formed at the inner periphery of said attaching cover to mount each outer periphery of said flange portions.

4. An inlet union for a master cylinder in accordance with claim 3, wherein each of said depressions in said cover have a diameter and at least a portion of said depression diameter is less than said flange portion diameter.

5. an inlet union for a master cylinder in accordance with claim 3, wherein said common attaching cover includes means for attaching said cover to said master cylinder body, said means for attaching comprising:

said common attaching cover includes a coupling portion, said coupling portion including at least one bore extending through said coupling portion and an engaging tongue which resiliently extends into at least a portion of said at least one bore;

said master cylinder body including at least one attaching portion, said at least one attaching portion including at least one through hole, said at least one through hole in alignment with said at least one bore when said common attaching cover is positioned on said master cylinder body; and at least one coupling pin slidingly received through both said at least one bore and said at least one through hole, said pin including a circumferentially extending groove, said groove and said engaging tongue comprising a means for maintaining said at least one coupling pin in position in said at least one bore and said at least one through hole.

* * * * *